(12) United States Patent
Villagran et al.

(10) Patent No.: US 6,673,384 B1
(45) Date of Patent: Jan. 6, 2004

(54) CREAMY MOUTHFEEL AGENT FOR FOODS AND BEVERAGES

(75) Inventors: Francisco Valentino Villagran, West Chester, OH (US); Glenn James Dria, Hamilton, OH (US); Jeffrey Lee Butterbaugh, Cincinnati, OH (US); Leonard Edwin Small, Cincinnati, OH (US)

(73) Assignee: The Procter & Gamble Co., Cincinnati, OH (US)

( * ) Notice: Subject to any disclaimer, the term of this patent is extended or adjusted under 35 U.S.C. 154(b) by 0 days.

(21) Appl. No.: 09/240,128

(22) Filed: Jan. 29, 1999

Related U.S. Application Data

(63) Continuation-in-part of application No. 09/016,669, filed on Jan. 30, 1998, now abandoned.

(51) Int. Cl.⁷ .............................. A23J 3/00; A23J 3/08; A23J 3/14
(52) U.S. Cl. ...................... 426/575; 426/578; 426/656; 426/657
(58) Field of Search ................................ 426/601, 658, 426/564, 565, 656, 657, 575, 578

(56) References Cited

U.S. PATENT DOCUMENTS

| | | | | |
|---|---|---|---|---|
| 4,539,215 A | * | 9/1985 | Schweid et al. | 426/589 |
| 4,551,346 A | | 11/1985 | Kilroy | 426/602 |
| 4,626,441 A | | 12/1986 | Wolkstein | 426/548 |
| 4,734,287 A | | 3/1988 | Singer et al. | 426/41 |
| 4,746,520 A | | 5/1988 | Smits et al. | 426/103 |
| 4,746,527 A | | 5/1988 | Kuypers | 426/569 |
| 4,748,040 A | | 5/1988 | Kuypers | 426/569 |
| 4,855,156 A | | 8/1989 | Singer et al. | 426/565 |
| 4,911,946 A | | 3/1990 | Singer et al. | 426/658 |
| 4,961,953 A | | 10/1990 | Singer et al. | 426/656 |
| 4,985,270 A | | 1/1991 | Singer et al. | 426/515 |
| 5,021,248 A | | 6/1991 | Stark et al. | 426/96 |
| 5,080,921 A | * | 1/1992 | Reimer | 426/564 |
| 5,098,728 A | | 3/1992 | Singer et al. | 426/579 |
| 5,104,674 A | | 4/1992 | Chen et al. | 426/573 |
| 5,145,702 A | | 9/1992 | Stark et al. | 426/531 |
| 5,147,677 A | | 9/1992 | Ziegler | 426/614 |
| 5,153,020 A | | 10/1992 | Singer et al. | 426/567 |
| 5,171,603 A | | 12/1992 | Singer et al. | 426/572 |
| 5,175,015 A | | 12/1992 | Kahn et al. | 426/585 |
| 5,178,895 A | | 1/1993 | Duckworth | 426/589 |
| 5,229,158 A | | 7/1993 | Yalpani | 426/565 |
| 5,260,084 A | | 11/1993 | Nixon | 426/580 |
| 5,264,235 A | | 11/1993 | Duckworth | 426/589 |
| 5,290,581 A | | 3/1994 | Campbell et al. | 426/570 |
| 5,322,702 A | | 6/1994 | Selinger et al. | 426/583 |
| 5,330,778 A | | 7/1994 | Stark et al. | 426/531 |
| 5,336,514 A | | 8/1994 | Jones et al. | 426/564 |
| 5,368,869 A | | 11/1994 | Savello et al. | 426/42 |
| 5,370,894 A | | 12/1994 | Singer | 426/567 |
| 5,374,441 A | | 12/1994 | Gibson et al. | 426/656 |
| 5,478,587 A | | 12/1995 | Mingione | 426/565 |
| 5,480,670 A | | 1/1996 | Pordy | 426/580 |
| 5,520,946 A | | 5/1996 | Chablaix et al. | 426/570 |
| 5,532,019 A | * | 7/1996 | Miller et al. | 426/589 |
| 5,536,514 A | | 7/1996 | Bishay et al. | 426/103 |
| 5,580,600 A | | 12/1996 | Strong et al. | 426/585 |
| 5,616,358 A | | 4/1997 | Taylor et al. | 426/590 |
| 5,718,969 A | | 2/1998 | Sewall et al. | 428/304.4 |
| 5,738,900 A | | 4/1998 | Cuadrado et al. | 426/658 |
| 5,780,092 A | | 7/1998 | Agbo et al. | 426/569 |

FOREIGN PATENT DOCUMENTS

| | | | |
|---|---|---|---|
| EP | 0 515 246 A2 | 5/1991 | A23J/3/10 |
| EP | 0 485 663 A1 | 5/1992 | A23J/3/08 |
| EP | 0 515 246 A3 | 5/1992 | A23J/3/10 |
| EP | 0 533 815 B1 | 3/1993 | A23L/1/308 |
| EP | 0 534 875 A2 | 3/1993 | A23C/11/08 |
| EP | 0 434 760 B1 | 1/1994 | A23J/3/14 |
| EP | 0 484 508 B1 | 1/1996 | A23J/3/08 |
| EP | 0 780 055 A2 | 6/1997 | A23F/5/40 |
| JP | 03133336 A | 9/1993 | A23C/11/00 |
| WO | WO 93/07761 | 4/1993 | A23J/1/20 |
| WO | WO 95/24833 | 9/1995 | A23L/1/0532 |
| WO | WO 95/27003 | 10/1995 | C08L/3/02 |
| WO | WO 97/33482 | 9/1997 | A23F/5/40 |
| WO | WO 98/06279 | 2/1998 | A23L/1/32 |

OTHER PUBLICATIONS

Anon, *SimplesseRegistered—first products launched in the UK*, Confectionery Production, vol. 58, No. 3, pp. 208–209 and 211, 1992, Abstract only.

(List continued on next page.)

*Primary Examiner*—Arthur L. Corbin
(74) *Attorney, Agent, or Firm*—Carl J. Roof; S. Robert Chury

(57) ABSTRACT

The present invention relates to an agent for imparting creamy mouthfeel to foods and beverages. Said agent comprises a water-insoluble component and a water-soluble component. Said water-insoluble component has particles with a mean particle size diameter of from about 0.1 to about 3.0 microns and comprises: (a) from about 5 to about 70% of a microparticlulate component; (b) from about 0 to about 60% of fat/oil component; (c) from about 0 to about 5% of emulsifier component; (d) up to about 5% of a microcrystalline cellulose component. Said water-soluble component comprises: (a) from about 0.05 to about 40% of a thickener; (b) from about 0 to about 10% sodium caseinate; (c) from 0 to about 40% milk solids; and (d) from about 0 to about 4% processing aids. The creamy mouthfeel agent of the present invention comprises from about 0 to about 10% flavorants; said flavorants may be part of the water-insoluble components, the water-soluble components; or both. The water-insoluble components comprises at least 60% of the total solids of the creamy mouthfeel agent.

11 Claims, No Drawings

OTHER PUBLICATIONS

Anon, *SimplessRegistered—fat alternative*, European Dairy Magazine, vol. 5, No. 1, pp. 40–42, 1993, Abstract only.

Anon, *Fat substitute for dairy and oil–based products*, Food Technology, vol. 42, No. 4, pp. 96–97, 1988.

Cheftel, J.C. and Dumay, E.; *Microcoagulation of proteins for development of 'creaminess'*, Food Reviews International, vol. 9, No. 4, pp. 473–502, 1993, Abstract only.

Kammerlehner, J.; [*Simplesse Registered and Dry DimplesseRegistered 100.*] *SimplesseRegistered 100—Dry SimplesseRegistered 100*, DMZ Lebensmittelindustrie und Milchwirtschaft, vol. 114, No. 29, pp. 848, 850–852, 1993, Abstract only.

Simplesse Informationsbuero, *Microparticulated milk protein. Improved sensory quality for low fat foods*, Zucker und Suesswarenwirtschaft, vol. 47, no. 9, pp. 358–359, 1994, Abstrat only.

Stern, J.S. and Hermann–Zaidins, M.G.; *Fat replacements: a new strategy for dietary change*, Journal of the American Dietetic Association, vol. 92, No. 1, pp. 91–93, 1992, Abstract only.

Zumbro Inc.; *Rice solids sub for fat*, Prepared Foods, vol. 161, No. 6, p. 121, 1992.

\* cited by examiner

CREAMY MOUTHFEEL AGENT FOR FOODS AND BEVERAGES

CROSS REFERENCE TO RELATED APPLICATION

This application is a Continuation-in-Part of application Ser. No. 09/016,669, filed Jan. 30, 1998 now abandoned.

TECHNICAL FIELD

The present invention relates to an agent useful for imparting a creamy, lubricious, thick and/or rich mouthfeel to food and beverage products. The present invention also relates to a method for producing this agent, and the use of this agent in various food and beverage products.

BACKGROUND

A creamy, lubricious mouthfeel is desired in many instant and ready-to-eat/drink food and beverage products such as flavored beverages (coffees, hot chocolates, teas, creamy juice drinks, milk shakes and the like); mayonaise, salad dressings, sauces, gravies, puddings, and mousses. Consumers generally desire a particular creamy mouthfeel, richness, sweetness and flavor impact in these products. These attributes are usually delivered by commerically prepared creamers, or hydrocolloids, pectins, and/or starches. Alternatively, the food or beverage product may be formulated to contain high solids.

Many of these food and beverage products are sold ready-to-eat/drink, and usually have greater than 10% solids. Many of these products are sold to the consumer in dry mix form as an "instant" product and the consumer prepares the final form to be consumed using water, milk, juice or other suitable liquid. If the solids level cannot be easily and reliably controlled when the instant product is reconstituted by the consumer, then the consumer may perceive these products as thin and watery. In beverage products, there may be a failure of the product to develop a foamy texture or frothy head.

Creamy and/or rich food and beverage products typically rely on finely dispersed fat (i.e. homogenized fat) to deliver desired mouthfeel. This emulsified fat is generally delivered by liquid or spray-dried non-dairy creamers, whole milk, or low-fat milk. The level of fat generally found in these products provides insufficient mouthfeel benefits. These mouthfeel benefits can be improved by increasing the level of fat, either by using a more fatty creamer, or by adding additional fat to the food or beverage product. However, increasing the level of fat creates other issues such as the stability of the fat against oxidative reactions, the development of off-flavors and the potential instability of the emulsion designed to deliver the finely dispersed fat. Further, since typical non-dairy creamers typically contain only 35–50% fat, delivering increased mouthfeel can require significantly higher volumes or dosages of powdered products. This makes these powdered products less useful as spoonable executions.

An alternative approach to delivering mouthfeel in food and beverage products is to use ingredients that increase the thickness (viscosity) of the product. However, increasing the viscosity of the beverage does not necessarily translate into an increase in desirable mouthfeel attributes. Mouthfeel is more of a sensory perception influenced by forces distinct from those that contribute to viscosity which give the perception of thickness. Hydrocolloid gums and water-soluble starches are typically used to increase beverage thickness (i.e. viscosity). However, hydrocolloid gums can only develop limited mouthfeel, and often impact negative textural effects such as "sliminess" or "stringiness". In addition, beverage products, especially hot beverages, which incorporate high concentrations of hydrocolloid gums are subject to gel upon cooling.

Water-soluble starches can also be used to increase viscosity and provide limited mouthfeel. However, the quantity of water-soluble starch needed to deliver these attributes is usually so high that more solids are added and the desired target dosage of solids in instant products cannot be achieved. Mouthfeel, richness, creaminess, sweetness and flavor impact can be increased by delivering a higher dosage of solids. However, a higher level of solids requires larger volume of product to be used. Generally, this translates to formulation difficulties, which vary, given the end-application of the food and beverage product. For instance, in instant beverage products, this usually translates to an increase in the amount of dry product (usually the number of spoonfuls) necessary to prepare the beverage. For puddings, mousses, dressings, gravies, and sauces, the amount of dry material necessary to make the final product increases dramatically. This leads to increased size of packaging necessary for the same amount of finished, consumable products; packaging would have to be, either, enlarged to get the same amount of servings of food to be consumed (this leads to environmental and storage issues), or the consumer would get less servings out of the current packaging size (this leads to consumer inconvenience). Additionally, at high levels of solids, flavor and mouthfeel can be distorted. High levels of solids can lead to higher level of fat and/or calories, as well as increased cost.

SUMMARY OF THE INVENTION

The present invention relates to an agent for imparting creamy mouthfeel (referred to herein as "creamy mouthfeel agent") to foods and beverages. Said agent comprises a water-insoluble component and a water-soluble component. Said water-insoluble component has particles with a mean particle size diameter of from about 0.1 to about 3.0 microns and comprises: (a) from about 5 to about 70% of a microparticulate component; (b) from about 0 to about 60% of fat/oil component; (c) from about 0 to about 5% of emulsifier component; (d) up to about 5% of a microcrystalline cellulose component. Said water-soluble component comprises: (a) from about 0.05 to about 40% of a thickener; (b) from about 0 to about 10% sodium caseinate; (c) from 0 to about 40% milk solids; and (d) from about 0 to about 4% processing aids. The creamy mouthfeel agent also comprises from about 0 to about 10% flavorants. Said flavorants can be part of the water-insoluble portion, the water-soluble portion, or both. The water-insoluble components comprises at least about 40%, preferably at least 60%, of the total solids of the creamy mouthfeel agent and/or the ratio of water-insoluble components to water-soluble components (I/S) is about 0.8 or greater, preferably about 1.5 or greater.

The creamy mouthfeel agent of the present invention can be used in food and beverage products where a rich, creamy mouthfeel is desired, and is particularly preferred in those food compositions where creamer products have been conventionally used (e.g. instant flavored coffees). Products where the creamy mouthfeel agent is suitable for use include instant and ready-to-serve beverages (flavored and unflavored coffees and teas, hot chocolate, juice-containing beverages, nutritional drinks in the form of shakes, malts, and the like (e.g. ENSURE®, a shake like beverage); puddings; sauces; gravies; dressings; mousses; ice cream;

yogurt; cream cheese; cheese dips and/or spreads; sour cream; vegetable dips and/or spreads; icings; whipped toppings; frozen confections; milk; coffee whitener; coffee lighteners; and dips and spreads.

The present invention also relates to a process for producing the mouthfeel agent of the present invention. Said process requires mixing of the water-insoluble, ingredients (e.g. the fat and emulsifier) first, then adding the water under high shear mixing. The water-insoluble ingredients, (corn syrup solids, starch, gums), are then added to the emulsion formed. The microparticulate component is then added under low shear mixing. The mouthfeel agent is homogenized at 1000/4600 psi in a conventional homogenizer..

DETAILED DESCRIPTION OF THE PRESENT INVENTION

A. Definitions

As used herein, the terms "ready-to-serve" food or beverage; "ready-to-eat" food; "ready-to-drink" beverage are used interchangeably to refer to food and beverage products that are in a ready-to-use, consumable form.

As used herein, the terms "instant" and "soluble," as they relate to food and beverage products, are used interchangeably to refer to food and beverage products, such as instant or soluble coffee products, that are relatively soluble in water, especially hot water. A mix (either in powder, dry mix, concentrate or emulsion form) is sold by the manufacturer and is typically mixed by the consumer with an aqueous liquid or diluent, i.e., water, milk or other aqueous medium, to provide a ready-to-serve food or beverage.

"Bulk density" refers to the overall density of a plurality of particles measured in the manner described on pp. 127–131 of COFFEE PROCESSING TECHNOLOGY, Avi Publishing Company, Westport, Conn., 1963, Vol. II.

The terms "moisture" and "water" are used interchangeably herein.

All particle sizes referred to herein are based on the U.S. Standard Sieve Screen Series. See page 701 of Sivetz & Desrosier, COFFEE TECHNOLOGY (Avi Publishing Co. 1979).

As used herein, the term "solids" are used to refer to all water-insoluble components and water-soluble components.

As used herein, the term "water-insoluble components" refers to those materials that are not soluble or miscible in water but are typically dispersed in the aqueous phase and are visible when viewed through a microscope. The water-insoluble components typically include fat/oil components, microparticulated components, and emulsifiers, and may optionally include flavorants and microcrystalline cellulose. One of ordinary skill in the art will readily understand that the water-insoluble components may be derived from multiple source ingredients and one source ingredient may contribute to multiple water-insoluble components.

As used herein, the term "water-soluble component" refers to those materials that are soluble or completely miscible in water and are not visible when viewed through a microscope. The water-soluble components typically include the sweeteners; buffers derived from salts (i.e., sodium bicarbonate, dipotassium phosphate); or acids (i.e., citric acid); thickeners, such as hydrolyzed starches (e.g., maltodextrins); pre-gelatinized starches, chemically modified food starches, hydrocolloid gums (e.g., carboxymethylcellulose); processing aids (e.g. flow aids such as silicon dioxide); and flavorants. One of ordinary skill in the art will readily understand that the water-soluble components may be derived from multiple source ingredients and one source ingredient may contribute to multiple water-soluble components.

As used herein, the term "microparticulate component" and "microparticles" are used interchangeably to refer to particles having mean particle size diameter between 0.1 and 3.0 microns preferably from about 0.4 to about 2.0 microns, and preferably with less than about 2% of the particles exceeding 3.0 microns. The microparticles can be obtained from protein, carbohydrate, starches, pectins and gums (hydrocolloids), or any mixture thereof, by using microparticulation processes known to those skilled in the art.

As used herein, the term "hydrocolloids" refers to the whole range of polymeric materials occurring naturally (gums, starches, proteins, etc.). The term "hydrocolloid gums" or simply "gums" refers to plant or microbial polysaccharides or their derivatives that are dispersible in either cold or hot water to produce viscous mixtures or solutions.

As used herein, the term "comprising" means various components and processing steps can be conjointly employed in the creamy mouthfeel agent and the food and beverage products made therewith, and process for preparing the creamy mouthfeel agent according to the present invention. Accordingly, the term "comprising" encompasses the more restrictive terms "consisting essentially of" and "consisting of."

All amounts, parts, ratios and percentages used herein are by weight unless otherwise specified.

B. Sources of Ingredients Used in the Creamy Mouthfeel Agent

1. Water-insoluble Components

The water-insoluble component comprises at least 60% of the total solids of the creamy mouthfeel agent of the present invention.

Fat/Oil Component. The terms "fat" and "oil" are used interchangeably herein unless otherwise specified. The terms "fat" or "oil" refer to edible fatty substances in a general sense, including natural or synthetic fats and oils consisting essentially of triglycerides, such as, for example soybean oil, corn oil, cottonseed oil, sunflower oil, palm oil, coconut oil, canola oil, fish oil, lard and tallow, which may have been partially- or fully- hydrogenated or modified otherwise, as well as non-toxic fatty materials having properties similar to triglycerides, herein referred to as non-digestible fat, which materials may be partially or fully indigestible. Reduced calorie fats and edible non-digestible fats, oils or fat substitutes are also included in the term.

The term "non-digestible fat" refers to those edible fatty materials that are partially or totally indigestible, e.g., polyol fatty acid polyesters, such as OLEAN™, manufactured by the Procter & Gamble Company, Cincinnati, Ohio. The terms "fat" or "oil" also refer 100% non-toxic fatty materials having properties similar to triglycerides. The terms "fat" or "oil" in general include fat-substitutes, which materials may be partially or fully non-digestible.

By "polyol" is meant a polyhydric alcohol containing at least 4, preferably from 4 to 11 hydroxyl groups. Polyols include sugars (i.e., monosaccharides, disaccharides, and trisaccharides), sugar alcohols, other sugar derivatives (i.e., alkyl glucosides), polyglycerols such as diglycerol and triglycerol, pentaerythritol, sugar ethers such as sorbitan and polyvinyl alcohols. Specific examples of suitable sugars, sugar alcohols and sugar derivatives include xylose, arabinose, ribose, xylitol, erythritol, glucose, methyl glucoside, mannose, galactose, fructose, sorbitol, maltose, lactose, sucrose, raffinose, and maltotriose.

By "polyol fatty acid polyester" is meant a polyol having at least 4 fatty acid ester groups. Polyol fatty acid esters that contain 3 or less fatty acid ester groups are generally digested in, and the products of digestion are absorbed from, the intestinal tract much in the manner of ordinary triglyceride fats or oils, whereas those polyol fatty acid esters containing 4 or more fatty acid ester groups are substantially non-digestible and consequently non-absorbable by the human body. It is not necessary that all of the hydroxyl groups of the polyol be esterified, but it is preferable that disaccharide molecules contain no more than 3 unesterified hydroxyl groups for the purpose of being non-digestible. Typically, substantially all, e.g., at least about 85%, of the hydroxyl groups of the polyol are esterified. In the case of sucrose polyesters, typically from about 7 to 8 of the hydroxyl groups of the polyol are esterified.

The polyol fatty acid esters typically contain fatty acid radicals typically having at least 4 carbon atoms and up to 26 carbon atoms. These fatty acid radicals can be derived from naturally occurring or synthetic fatty acids. The fatty acid radicals can be saturated or unsaturated, including positional or geometric isomers, e.g., cis- or trans- isomers, and can be the same for all ester groups, or can be mixtures of different fatty acids.

Liquid non-digestible oils can also be used in the practice of the present invention. Liquid non-digestible oils have a complete melting point below about 37° C. include liquid polyol fatty acid polyesters (see Jandacek; U.S. Pat. No. 4,005,195; issued Jan. 25, 1977); liquid esters of tricarballylic acids (see Hamm; U.S. Pat. No. 4,508,746; issued Apr. 2, 1985); liquid diesters of dicarboxylic acids such as derivatives of malonic and succinic acid (see Fulcher; U.S. Pat. No. 4,582,927; issued Apr. 15, 1986); liquid triglycerides of alpha-branched chain carboxylic acids (see Whyte; U.S. Pat. No. 3,579,548; issued May 18, 1971); liquid ethers and ether esters containing the neopentyl moiety (see Minich; U.S. Pat. No. 2,962,419; issued Nov. 29, 1960); liquid fatty polyethers of polyglycerol (See Hunter et al; U.S. Pat. No. 3,932,532; issued Jan. 13, 1976); liquid alkyl glycoside fatty acid polyesters (see Meyer et al; U.S. Pat. No. 4,840,815; issued Jun. 20, 1989); liquid polyesters of two ether linked hydroxypolycarboxylic acids (e.g., citric or isocitric acid) (see Huhn et al; U.S. Pat. No. 4,888,195; issued Dec. 19, 1988); various liquid esterfied alkoxylated polyols including liquid esters of epoxide-extended polyols such as liquid esterified propoxylated glycerins (see White et al; U.S. Pat. No. 4,861,613; issued Aug. 29, 1989; Cooper et al; U.S. Pat. No. 5,399.729; issued Mar. 21, 1995; Mazurek; U.S. Pat. No. 5,589,217; issued Dec. 31, 1996; and Mazurek; U.S. Pat. No. 5,597,605; issued Jan. 28, 1997); liquid esterified ethoxylated sugar and sugar alcohol esters (see Ennis et al; U.S. Pat. No. 5,077,073); liquid esterified ethoxylated alkyl glycosides (see Ennis et al; U.S. Pat. No. 5,059,443, issued Oct. 22, 1991); liquid esterified alkoxylated polysaccharides (see Cooper; U.S. Pat. No. 5,273,772; issued Dec. 28, 1993); liquid linked esterified alkoxylated polyols (see Ferenz; U.S. Pat. No. 5,427,815; issued Jun. 27, 1995 and Ferenz et al; U.S. Pat. No. 5,374,446; issued Dec. 20, 1994); liquid esterfied polyoxyalkylene block copolymers (see Cooper; U.S. Pat. 5,308,634; issued May 3, 1994); liquid esterified polyethers containing ring-opened oxolane units (see Cooper; U.S. Pat. No. 5,389,392; issued Feb. 14, 1995); liquid alkoxylated polyglycerol polyesters (see Harris; U.S. Pat. No. 5,399,371; issued Mar. 21, 1995); liquid partially esterified polysaccharides (see White; U.S. Pat. No. 4,959,466; issued Sep. 25, 1990); as well as liquid polydimethyl siloxanes (e.g., Fluid Silicones available from Dow Corning). All of the foregoing patents relating to the liquid nondigestible oil component are incorporated herein by reference. Solid non-digestible fats or other solid materials can be added to the liquid non-digestible oils to prevent passive oil loss. Particularly preferred non-digestible fat compositions include those described in U.S. Pat. No. 5,490,995 issued to Corrigan, 1996, U.S. Pat. No. 5,480,667 issued to Corrigan et al, 1996, U.S. Pat. No. 5,451,416 issued to Johnston et al, 1995 and U.S. Pat. No. 5,422,131 issued to Elsen et al, 1995. U.S. Pat. No. 5,419,925 issued to Seiden et al, 1995 describes mixtures of reduced calorie triglycerides and polyol polyesters that can be used herein. However the latter composition may provide more digestible fat.

The preferred non-digestible fats are fatty materials having properties similar to triglycerides such as sucrose polyesters. OLEAN,™ a preferred non-digestible fat, is made by The Procter and Gamble Company. These preferred non-digestible fat or oil substitute compositions are described in Young; et al., U.S. Pat. No. 5,085,884, issued Feb. 4, 1992, and U. S. Pat. No. 5,422,131, issued Jun. 6, 1995 to Elsen et al.

Other ingredients known in the art may also be added to the edible fats and oils, including antioxidants such as TBHQ ascorbic acid, chelating agents such as citric acid, and anti-foaming agents such as dimethylpolysiloxane.

Emulsifiers. Emulsifiers help to disperse the fat/oil in the food and beverage products (instant and ready-to-serve) which are made using the creamy mouthfeel agent of the present invention. Any food grade emulsifier suitable for inclusion in edible products can be used. Examples of suitable emulsifiers include mono and di-glycerides of long chain fatty acids, preferably saturated fatty acids, and most preferably, stearic and palmitic acid mono- and diglycerides. Propylene glycol esters are also useful in these edible mixes. Lecithin is an especially preferred emulsifier for use in the edible mixes and ready-to-serve beverages of the present invention. The emulsifier can be any food compatible emulsifier such as mono- and di-glycerides, lecithin, sucrose monoesters, polyglycerol esters, sorbitan esters, polyethoxylated glycerols and mixtures thereof. Up to about 3% and preferably from 0.1 to 3% stabilizer or emulsifier is used. Suitable emulsifiers are lactylated mono- and diglycerides, propylene glycol monoesters, polyglycerol esters, sorbitan esters, diacetylated tartaric acid esters of mono- and diglycerides, citric acid esters of monoglycerides, stearoyl-2-lactylates, polysorbates, succinylated monoglycerides, acetylated monoglycerides, ethoxylated monoglycerides, lecithin, sucrose monoester, and mixtures thereof. Suitable emulsifiers include Mono and Di-glycerides, such as. DIMODAN O®, DIMODAN® PV, and PANODAN FDP® manufactured by Danisco Foods, Inc. The emulsifiers may be utilized with a coemulsifier. Depending on the particular formulation chosen, suitable coemulsifiers may be chosen from any food compatible co-emulsifier or emulsifier. Particularly preferred emulsifier/coemulsifier systems include DIMODAN O®, DIMODAN PV®, PANODAN FDP®.

Microparticulate Component. The microparticulate component useful in the creamy mouthfeel agent of the present invention is made up of microparticles that have a substantially spheroidal shape and display fat-like mouthfeel characteristics when the particles have a mean diameter distribution in the range of from about 0.1 to about 3 microns, with less than about 2% of the total number of particles over 3 microns. The particles are non-aggregated and exhibit a substantially smooth organoleptic character of an oil-in-water emulsion.

These microparticles can be prepared from a carbohydrate that can attain a substantially spheroidal or substantially round shape in the 0.1 to 3 micron diameter size range. These microparticles include, but are not limited to, LITA®, a zein protein combined with gum arabic. See also, for example, U.S. Pat. No. 4,911,946 (Singer et al), issued Mar. 27, 1990; and U.S. Pat. No. 5,153,020 (Singer et al), issued Oct. 6, 1992, both of which are incorporated by reference. Suitable carbohydrates include starches, gums and/or cellulose, as well as mixtures thereof. The starches are typically modified by cross-linking to prevent excessive swelling of the starch granules using methods well-known to those skilled in the art. Other suitable carbohydrates include calcium alginate, cross-linked dextran, gellan gum, curdlan, konjac mannan, chitin, schizophyllan and chitosan. Carbohydrates that do not have a natural round shape must be treated so that they attain a substantially spheroidal shape. This can be accomplished by making a solution of the carbohydrate and converting the solution to a gel quickly and uniformly (generally in a field of high shear-force) so that a narrow distribution of gelled microparticles are formed having the above described diameters. Generally, a stream of carbohydrate solution will be introduced into a highly turbulent reaction zone where the gelled microparticles are formed. High speed mixing and shearing conditions can also be employed. Calcium alginate microparticles can be formed by making a solution of sodium alginate and introducing this solution into a calcium ion containing solution through e.g. an ultrasonic spray nozzle or any device producing droplets less than 3 microns in diameter. Gellan can be microparticulated by spray cooling a hot gellan solution via any device capable of producing droplets less than 3 microns resulting in the formation of spheriodally-shaped microparticles. Konjac mannan can be microparticulated by introducing a solution into a turbulent, heated, alkaline reaction zone. Once the carbohydrate microparticles are formed, they must be substantially non-aggregated and remain that way. Aggregate blocking agents, for example, lecithin and xanthan gum, can be added to the microparticle to stabilize the particles. See U.S. Pat. No. 4,734,287 (Singer et al), issued Mar. 29, 1988, which is incorporated by reference.

The microparticles of the microparticulate component can also be prepared from any protein that can attain a substantially spheroidal or substantially round shape in the 0.1 to 3 micron diameter size range. These microparticles include SIMPIESSE. 100® (whey protein) and DAIRY-LO® (whey protein) or mixtures thereof. See U.S. Pat. No. 4,734,287 (Singer et al), issued Mar. 29, 1988; and U.S. Pat. No. 4,961,953 (Singer et al), issued Jun. 16, 1989, both of which are incorporated by reference. Suitable protein sources for preparing such microparticles include egg and milk proteins, plant proteins (especially including oilseed proteins obtained from cotton, palm, rape, safflower, cocoa, sunflower, sesame, soy, peanut, and the like), and microbial proteins such as yeast proteins and the so-called "single cell" proteins. Preferred proteins include dairy whey protein (especially sweet dairy whey protein), and non-dairy-whey proteins such as bovine serum albumin, egg white albumin, and vegetable whey proteins (i.e., non-dairy whey protein) such as soy protein. Microparticles are readily prepared from solutions of these proteins through controlled application of heat and high shear conditions facilitative of controlled protein denaturation in a physical and chemical context allowing for the formation of non-aggregated proteinaceous microparticles of the desired size and shape. The particles formed during denaturation are generally spherical in shape and have average diameters in excess of about 0.1 microns. The formation of particles in excess of about 2 microns in diameter and/or formation of aggregates of small particles with aggregate diameters in excess of 2 microns is substantially avoided. Alternatively, the formation of particles or aggregates of particles having volumes in excess of 5.5 cubic microns is avoided while forming substantial numbers of particles having volumes of $5 \times 10^{-4}$ cubic microns or more. The protein denaturing temperatures employed and the duration of heat treatment will vary depending upon the particular protein starting material. In a like manner, the specific high shear conditions including the duration of shear applied to protein solutions will also vary. During the denaturation processing, undenatured proteins in solution interact to form insoluble coagulates and the controlled application of heat and high shear forces operate to insure formation of non-aggregated particles within the desired size range. Depending upon the specific properties of dissolved commercial protein materials and the properties of non-protein constituents in the solutions of these materials, the application of heat and high shear alone may not optimally allow for the avoidance of oversized particle aggregates. In such situation, one or more materials such as lecithin, xanthan gum, maltodextrins, carageenan, datem esters, alginates, and the like, (referred to as "aggregate blocking agents") can be added to the protein solutions, most preferably prior to heat denaturation processing.

Microcrystalline Cellulose. The creamy mouthfeel agent of the present invention may also contain microcrystalline cellulose. Microcrystalline cellulose sometimes referred to as "cellulose gel" is a nonfibrous form of cellulose that is prepared by partially depolymerizing cellulose obtained as a pulp from fibrous plant material with dilute mineral acid solutions. Following hydrolysis, the hydrocellulose is purified via filtration and the aqueous slurry is spray dried to form dry, white, odorless, tasteless, porous particles having a broad size distribution. See U.S. Pat. No. 3,023,104, issued Feb. 27, 1962, U.S. Pat. No. 2,978,446 and U.S. Pat. No. 3,141,875 (all of which are incorporated by reference) which disclose methods of preparing microcystalline cellulose. Suitable commercially available microcrystalline celluloses include EMCOCEL®. from Edward Mendell Co., Inc. and AVICEL®. from FMC Corp. In addition, microcrystalline cellulose can be produced through a microbial fermentation process. Commercially available microcrystalline cellulose produced by a fermentation process includes PRIMACEL™ from The Nutrasweet Kelco Company.

2. Water-soluble Component

Buffers. The creamy mouthfeel agent of the present invention utilizes buffers, preferably stabilizing salts, to improve the colloidal solubility of proteins and maintain the pH of the finished beverage from 6.2 to 7.0 for optimum stability and flavor. The disodium or dipotassium salts of citrate and/or phosphoric acid are most commonly used. The use of phosphate salts is particularly desirable when the water hardness used for the manufacture is high and calcium or magnesium.

Thickeners. The creamy mouthfeel agent of the present invention can comprise thickening agents. These thickening agents include natural and synthetic gums, and natural and chemically modified starches. Suitable gums include locust bean gum, guar gum, gellan gum, xanthan gum, gum ghatti, modified gum ghatti, tragacanth gum, carrageenan, and/or anionic polymers derived from cellulose such as carboxymethylcellulose, sodium carboxymethylcellulose, as well as mixtures of these gums. Suitable starches include pregelatinized starch (corn, wheat, tapioca), pregelatinized high amylose-content starch, pregelatinized hydrolyzed starches (maltodextrins, corn syrup solids), chemically modified starches such as pregelatinized substituted starches (e.g., octenyl succinate modified starches such as N-CREAMER®, N-LITE® LP, TEXTRA®, etc.), as well as mixtures of these starches. It is particularly preferred that the thickening agent be predominantly made from starches and that no more than 20%, mores preferably no more than 10%, of the thickener be made from gums. These thickening agents can also be incorporated into these creamy mouthfeel agents as part of the carrier for the emulsified fat on the spray dried non-foaming creamer.

Sodium Caseinate. The creamy mouthfeel agent of the present invention comprises from 3–15%, preferably 2.5–8%, and more preferably 3–7%, sodium caseinate. This protein serves a multi-purpose function in creamers. It provides emulsification, some whitening power, and imparts flavor. Sodium caseinate provides a stable emulsion by virtue of its encapsulating ability of fat globules. Sodium caseinate is usually required to produce stable fat droplets in the spray dried powders since an adsorbed proteinaceous layer is better able to withstand the extreme conditions in the drier.

Milk Solids. Milk solids can also be included in the creamy mouthfeel agent of the present invention. These milk solids can be prepared by drying milk to produce a mixture of the proteins, minerals, whey and other components of milk in a dry form. These solids can include butterfat solids and cream powder but are preferably low-fat dry milk and non-fat milk solids, i.e., the solids derived from milk that has had the fat removed. Any commercial source of non-fat or other milk solids can be used.

Processing Aids. Optional ingredients in the creamy mouthfeel agent of the present invention are processing aids, including flow aids, anti-caking agents, dispersing aids and the like. Particularly preferred are flow aids such as silicon dioxide and silica aluminates. Starches, aside from those used as thickening agents, can also be included to keep the various ingredients from caking.

3. Flavorants

The creamy mouthfeel agent of the present invention typically includes flavorant(s) other than those inherently present in the soluble beverage component. These flavorants may be included in the water-insoluble components the water-soluble components, or both. Preferably, such flavors are sourced from encapsulated or liquid flavors. These flavors can be natural or artificial in origin. Preferred flavors include almond nut, amaretto, anisette, brandy, cappuccino, mint, cinnamon, cinnamon almond, creme de menthe, GRAND MARINER®, peppermint stick, pistachio, sambuca, apple, chamomile, cinnamon spice, creme, creme de menthe, vanilla, French vanilla, Irish creme, KAHLUA®, lemon, mint, peppermint, macadamia nut, orange, orange leaf, peach, strawberry, grape, raspberry, cherry, coffee, chocolate, cocoa, mocha and the like, aroma enhancers such as acetaldehyde, herbs, spices, as well as mixtures of these flavors.

4. Water-insoluble Components

Fat/Oil. The terms "fat" and "oil" are used interchangeably herein unless otherwise specified. The terms "fat" or "oil" refer to edible fatty substances in a general sense, including natural or synthetic fats and oils consisting essentially of triglycerides, such as, for example soybean oil, corn oil, cottonseed oil, sunflower oil, palm oil, coconut oil, canola oil, fish oil, lard and tallow, which may have been partially- or fully-hydrogenated or modified otherwise, as well as non-toxic fatty materials having properties similar to triglycerides, herein referred to as non-digestible fat, which materials may be partially or fully indigestible. Reduced calorie fats and edible non-digestible fats, oils or fat substitutes are also included in the term.

The term "non-digestible fat" refers to those edible fatty materials that are partially or totally indigestible, e.g., polyol fatty acid polyesters, such as OLEAN™.

The terms "fat" or "oil" also refer 100% non-toxic fatty materials having properties similar to triglycerides. The terms "fat" or "oil" in general include fat-substitutes, which materials may be partially or fully non-digestible.

By "polyol" is meant a polyhydric alcohol containing at least 4, preferably from 4 to 11 hydroxyl groups. Polyols include sugars (i.e., monosaccharides, disaccharides, and trisaccharides), sugar alcohols, other sugar derivatives (i.e., alkyl glucosides), polyglycerols such as diglycerol and triglycerol, pentearythritol, sugar ethers such as sorbitan and polyvinyl alcohols. Specific examples of suitable sugars, sugar alcohols and sugar derivatives include xylose, arabinose, ribose, xylitol, erythritol, glucose, methyl glucoside, mannose, galactose, fructose, sorbitol, maltose, lactose, sucrose, raffinose, and maltotriose.

By "polyol fatty acid polyester" is meant a polyol having at least 4 fatty acid ester groups. Polyol fatty acid esters that contain 3 or less fatty acid ester groups are generally digested in, and the products of digestion are absorbed from, the intestinal tract much in the manner of ordinary triglyceride fats or oils, whereas those polyol fatty acid esters containing 4 or more fatty acid ester groups are substantially non-digestible and consequently non-absorbable by the human body. It is not necessary that all of the hydroxyl groups of the polyol be esterified, but it is preferable that disaccharide molecules contain no more than 3 unesterified hydroxyl groups for the purpose of being non-digestible. Typically, substantially all, e.g., at least about 85%, of the hydroxyl groups of the polyol are esterified. In the case of sucrose polyesters, typically from about 7 to 8 of the hydroxyl groups of the polyol are esterified.

The polyol fatty acid esters typically contain fatty acid radicals typically having at least 4 carbon atoms and up to 26 carbon atoms. These fatty acid radicals can be derived from naturally occurring or synthetic fatty acids. The fatty acid radicals can be saturated or unsaturated, including positional or geometric isomers, e.g., cis- or trans-isomers, and can be the same for all ester groups, or can be mixtures of different fatty acids.

Liquid non-digestible oils can also be used in the practice of the present invention. Liquid non-digestible oils have a complete melting point below about 37° C. include liquid polyol fatty acid polyesters (see Jandacek; U.S. Pat. No. 4,005,195; issued Jan. 25, 1977); liquid esters of tricarballylic acids (see Hamm; U.S. Pat. No. 4,508,746; issued Apr. 2, 1985); liquid diesters of dicarboxylic acids such as derivatives of malonic and succinic acid (see Fulcher; U.S. Pat. No. 4,582,927; issued Apr. 15, 1986); liquid triglycerides of alpha-branched chain carboxylic acids (see Whyte; U.S. Pat. No. 3,579,548; issued May 18, 1971); liquid ethers and ether esters containing the neopentyl moiety (see Minich; U.S. Pat. No. 2,962,419; issued Nov. 29, 1960); liquid fatty polyethers of polyglycerol (See Hunter et al; U.S. Pat. No. 3,932,532; issued Jan. 13, 1976); liquid alkyl glycoside fatty acid polyesters (see Meyer et al; U.S. Pat. No. 4,840, 815; issued Jun. 20, 1989); liquid polyesters of two ether linked hydroxypolycarboxylic acids (e.g., citric or isocitric acid) (see Huhn et al; U.S. Pat. No. 4,888,195; issued Dec. 19, 1988); various liquid esterfied alkoxylated polyols including liquid esters of epoxide-extended polyols such as liquid esterified propoxylated glycerins (see White et al; U.S. Pat. No. 4,861,613; issued Aug. 29, 1989; Cooper et al; U.S. Pat. No. 5,399,729; issued Mar.21, 1995; Mazurek; U.S. Pat. No. 5,589,217; issued Dec. 31, 1996; and Mazurek; U.S. Pat. No. 5,597,605; issued Jan. 28, 1997); liquid esterified ethoxylated sugar and sugar alcohol esters (see Ennis et al; U.S. Pat. No. 5,077,073); liquid esterified ethoxylated alkyl glycosides (see Ennis et al; U.S. Pat. No. 5,059,443, issued Oct. 22, 1991); liquid esterified alkoxylated polysaccharides (see Cooper; U.S. Pat. No. 5,273,772; issued Dec. 28, 1993); liquid linked esterified alkoxylated polyols (see Ferenz; U.S. Pat. No. 5,427,815; issued Jun. 27, 1995 and Ferenz et al; U.S. Pat. No. 5,374,446; issued Dec. 20, 1994); liquid esterfied polyoxyalkylene block copolymers (see Cooper; U.S. Pat. No. 5,308,634; issued May 3, 1994); liquid esterified polyethers containing ring-opened oxolane units (see Cooper; U.S. Pat. No. 5,389,392; issued February 14, 1995); liquid alkoxylated polyglycerol polyesters (see Harris; U.S. Pat. No. 5,399,371; issued Mar. 21, 1995); liquid partially esterified polysaccharides (see White; U.S. Pat. No. 4,959,466; issued Sep. 25, 1990); as well as liquid polydimethyl siloxanes (e.g., Fluid Silicones available from Dow Coming). All of the foregoing patents relating to the liquid nondigestible oil component are incorporated herein by reference. Solid non-digestible fats or other solid materials can be added to the liquid non-digestible oils to prevent passive oil loss. Particularly preferred non-digestible fat compositions include those described in U.S. Pat. No. 5,490,995 issued to Corrigan, 1996, U.S. Pat. No. 5,480,667 issued to Corrigan et al, 1996, U.S. Pat. No. 5,451,416 issued to Johnston et al, 1995, and U.S. Pat. No. 5,422,131 issued to Elsen et al, 1995. U.S. Pat. No. 5,419,925 issued to Seiden et al, 1995 describes mixtures of reduced calorie triglycerides and polyol polyesters that can be used herein. However the latter composition may provide more digestible fat.

The preferred non-digestible fats are fatty materials having properties similar to triglycerides such as sucrose polyesters. OLEAN, a preferred non-digestible fat, is made by The Procter and Gamble Company. These preferred non-digestible fat or oil substitute compositions are described in Young; et al., U.S. Pat. No. 5,085,884, issued Feb. 4, 1992, and U.S. Pat. No. 5,422,131, issued Jun. 6, 1995 to Elsen et al.

Other ingredients known in the art may also be added to the edible fats and oils, including antioxidants such as TBHQ ascorbic acid, chelating agents such as citric acid, and anti-foaming agents such as dimethylpolysiloxane.

The edible fats and oils with the proper particle size distribution (from about 0.1 to about 3.0 microns) are frequently delivered via a creamer.

Emulsifiers. Emulsifiers help to disperse fat in the beverage products of the present invention. Any food grade emulsifier suitable for inclusion in edible products can be used. Examples of suitable emulsifiers include mono- and di-glycerides of long chain fatty acids, preferably saturated fatty acids, and most preferably, stearic and palmitic acid mono- and di-glycerides. Propylene glycol esters are also useful in these edible mixes. Lecithin is an especially preferred emulsifier for use in the edible mixes and ready-to-serve beverages of the present invention. The emulsifier can be any food compatible emulsifier such as mono- and di-glycerides, lecithin, sucrose monoesters, polyglycerol esters, sorbitan esters, polyethoxylated glycerols and mixtures thereof. Up to about 5% and preferably from 0.1% to 3% stabilizer or emulsifier is used. Suitable emulsifiers are lactylated mono- and di-glycerides, propylene glycol monoesters, polyglycerol esters, sorbitan esters, diacetylated tartaric acid esters of mono- and di-glycerides, citric acid esters of monoglycerides, stearoyl-2-lactylates, polysorbates, succinylated monoglycerides, acetylated monoglycerides, ethoxylated monoglycerides, lecithin, sucrose monoester, and mixtures thereof. Suitable emulsifiers include DIMODAN O®, DIMODAN PV®, and PANODAN FDP®, manufactured by Danisco Food Ingredients. The emulsifiers may be utilized with a co-emulsifier. Depending on the particular formulation chosen, suitable co-emulsifiers may be chosen from any food compatible co-emulsifier or emulsifier. Particularly preferred emulsifier/co-emulsifier systems include, DIMODAN O®, DIMODAN PV®, and PANODAN FDP®.

Microparticulate component. The microparticles which make up the microparticulate component useful in the flavored beverage products of the present invention have a substantially spheroidal shape and display fat-like mouthfeel characteristics when the particles have a mean diameter distribution in the range of from about 0.1 to about 3 microns, preferably with less than about 2% of the total number of particles over 3 microns. The particles are non-aggregated and exhibit a substantially smooth organoleptic character of an oil-in-water emulsion.

These microparticles can be prepared from a carbohydrate that can attain a substantially spheroidal or substantially round shape in the 0.1 to 3 micron diameter size range. These microparticles include, but are not limited to LITA®, a mixture of Zein protein and gum arabic, or mixtures thereof. See also, for example, U.S. Pat. No. 4,911,946 (Singer et al), issued Mar. 27, 1990; and U.S. Pat. No. 5,153,020 (Singer et al), issued Oct. 6, 1992, both of which are incorporated by reference. Suitable carbohydrates include starches, gums and/or cellulose, as well as mixtures thereof. The starches are typically modified by cross-linking to prevent excessive swelling of the starch granules using methods well-known to those skilled in the art. Other suitable carbohydrates include calcium alginate, cross-linked, dextran, gellan gum, curdlan, konjac mannan, chitin, schizophyllan and chitosan. Carbohydrates that do not have a natural round shape must be treated so that they attain a substantially spheroidal shape. This can be accomplished by making a solution of the carbohydrate and converting the solution to a gel quickly and uniformly (generally in a field of high shear-force) so that a narrow distribution of a gelled microparticles are formed having the above described diameters. Generally, a stream of carbohydrate solution will be introduced into a highly turbulent reaction zone where the gelled microparticles are formed. High speed mixing and shearing conditions can also be employed. Calcium alginate microparticles can be formed by making a solution of sodium alginate and introducing this solution into a calcium ion containing solution through e.g. an ultrasonic spray nozzle or any device producing droplets less than 3 microns in diameter. Gellan can be microparticulated by spray cooling a hot gellan solution via any device capable of producing droplets less than 3 microns resulting in the formation of spheriodally-shaped microparticles. Konjac mannan can be microparticulated by introducing a solution into a turbulent, heated, alkaline reaction zone. Once the carbohydrate microparticles are formed, they must be substantially non-aggregated and remain that way. Aggregate blocking agents, for example, lecithin and xanthan gum, can be added to the microparticles to stabilize the particles. See U.S. Pat. No. 4,734,287 (Singer et al), issued Mar. 29, 1988, which is incorporated by reference.

These microparticles can also be prepared from any protein that can attain a substantially spheroidal or substantially round shape in the 0.1 to, 3 micron diameter size range. These microparticles include, but are not limited to, SIMPLESSE 100® and DAIRY-LO®, both of which are whey proteins, or mixtures thereof. See U.S. Pat. No. 4,734,287 (Singer et al), issued Mar. 29, 1988; and U.S. Pat. No. 4,961,953 (Singer et al), issued Jun. 16, 1989, both of which are incorporated by reference. Suitable protein sources for preparing such microparticles include egg and milk proteins, plant proteins (especially including oilseed proteins obtained from cotton, palm, rape, safflower, cocoa, sunflower, sesame, soy, peanut, and the like), and microbial proteins such as yeast proteins and the so-called "single cell" proteins. Preferred proteins include dairy whey protein (especially sweet dairy whey protein), and non-dairy-whey proteins such as bovine serum albumin, egg white albumin, and vegetable whey proteins (i.e., non-dairy whey protein) such as soy protein. microparticles are readily prepared from solutions of these proteins through controlled application of heat and high shear conditions facilitative of controlled protein denaturation in a physical and chemical context allowing for the formation of non-aggregated proteinaceous microparticles of the desired size and shape. The particles formed during denaturation are generally spherical in shape and have average diameters in excess of about 0.1 microns. The formation of particles in excess of about 2 microns in diameter and/or formation of aggregates of small particles with aggregate diameters in excess of 2 microns is substantially avoided. Alternatively, the formation of particles or aggregates of particles having volumes in excess of 5.5. cubic microns is avoided while forming substantial numbers of particles having volumes of $5 \times 10^{-4}$ cubic microns or more. The protein denaturing temperatures employed and the duration of heat treatment will vary depending upon the particular protein starting material. In a like manner, the specific high shear conditions including the duration of shear applied to protein solutions will also vary. During the denaturation processing, undenatured proteins in solution interact to form insoluble coagulates, and the controlled application of heat and high shear forces operate to insure formation of non-aggregated particles within the desired size range. Depending upon the specific properties of dissolved commercial protein materials and the properties of non-protein constituents in the solutions of these materials, the application of heat and high shear alone may not optimally allow for the avoidance of oversized particle aggregates. In such situation, one or more materials such as lecithin, xanthan gum, maltodextrins, carageenan, datem esters, alginates, and the like, (referred to as "aggregate blocking agents") can preferably be added to the protein solutions, most preferably prior to heat denaturation processing.

Microcrystalline cellulose. These carbohydrate- or protein-derived microparticles can be partially substituted with a microcrystalline cellulose. Microcrystalline cellulose (sometimes referred to as "cellulose gel") is a nonfibrous form of cellulose that is prepared by partially depolymerizing cellulose obtained as a pulp from fibrous plant material with dilute mineral acid solutions. Following hydrolysis, the hydrocellulose is purified via filtration and the aqueous slurry is spray-dried to form dry, white, odorless, tasteless, porous particles having a broad size distribution. See U.S. Pat. No. 3,023,104, issued Feb. 27, 1962, U.S. Pat. No. 2,978,446 and U.S. Pat. No. 3,141,875 (all of which are incorporated by reference) which disclose methods of preparing microcystalline cellulose. Suitable commercially available microcrystalline celluloses include EMCOCEL®. from Edward Mendell Co., Inc. and AVICEL®. from FMC Corp. In addition, microcrystalline cellulose can be produced through a microbial fermentation process. Commercially available microcrystalline cellulose produced by a fermentation process includes PRIMACEL™ from The Nutrasweet Kelco Company.

S/I Ratio, I/S Ratio, and I/V Ratio

The beverage products of the present invention, (especially preferred are instant coffee products), can deliver a creamy, rich, preferably foamy, beverage with a clean, improved mouthfeel and thickness without "sliminess" or "stringiness", as well as a higher flavor impact, at a lower dosage of solids (5–10%, preferably 6.5–8.5%, and more preferably 7.5%). This is achieved by formulating said beverage products so that (1) the level of finely dispersed water-insoluble components in the product is such that the ratio of (a) water-soluble to water-insoluble components (S/I) is about 3.3 or less, or (b) the ratio of water-insoluble to water-soluble (I/S) components is 0.30 or greater, preferably at least 0.40 or greater and most preferably between about 0.40 and about 0.80; and/or (2) the level of water-insoluble components per unit volume (I/V), is at least about 0.019 grams per cubic centimeter.

METHOD OF MAKING THE CREAMY MOUTHFEEL AGENT

The preferred method for preparing the creamy mouthfeel agent is as follows: The oil and emulsifiers are blended and heated to 150° F. (65.5° C.) or until all the fat has been melted. Hot water at 180° F. (82° C.) is added to the oil/emulsifier blend and mixed with a high shear mixer to form the proper emulsion. The water-soluble components are added while the high shear mixing continues. The microparticulated component is added and mixed with a low shear mixer, and until all particles are dispersed (no visible clumps). This blend is homogenized in a two stage APV Gaulin homogenizer at 1000/4600 psi. The homogenized creamy mouthfeel agent can be dried for instant application in a spray dryer using standard conditions for dairy products.

ANALYTICAL METHODS

Method for Measuring Particle Size of Protein/Stabilizer Particles. The particle size distribution of the water-insoluble components of the creamy mouthfeel agent of the present invention is measured using a laser scattering system, Horiba LA900 (Horiba, Calif.). Two types of distributions are used to properly define particle size. First, the Volume Distribution is used to follow structural changes and the effect of large particles in small number; this Volume Distribution usually results in a bimodal (some times trimodal) curve. Second, Number Distribution is used to measure the number of particles of a given median particle size. Typically, the Number Distribution results in a single peak which is properly characterized by its median. For median particle size below 0.5, there is no significant difference between median and mean particle size. However, we prefer to use median particle size to account for proper description for cases which depart from normal distribution. 1 to 2 ml samples are prepared according to the procedures recommended by the equipment manufacturer.

EXAMPLES

Example 1

Liquid Creamy Mouthfeel Agent: A liquid creamy mouthfeel agent (about 2900 ml) is prepared from the following ingredients:

| Ingredient | Grams |
| --- | --- |
| High Oleic Sunflower Oil | 52.9 |
| Simplesse 100 ® (microparticulated whey protein) | 19.44 |
| Starch | 14.04 |
| Corn Syrup Solids | 8.64 |
| Dipotassium Phosphate | 4.32 |
| Microcrystalline Cellulose | 2.16 |
| Carboxymethylcellulose | 4.32 |
| Emulsifier | 2.16 |
| Water | 2790 |

The oil and emulsifiers are blended in a 4000 ml beaker and heated to 150° F. (65.5° C.) until all the fat has been melted. One thousand ml of water at 180° F. (82° C.) is added to the oil/emulsifier blend and mixed with a high shear mixer for 1 minute to form the proper emulsion. The starch, corn syrup solids, microcrystalline cellulose, carboxymethlycellulose, dipotassium phosphate and 1290 ml of water at 180° F. (82° C.) are added while the high shear mixing continues. In a separate 1500 ml beaker, the SIMPLESSE 100® is mixed with 500 ml. of hot water at 180° F. (82° C.) using a magnetic stirrer and until all particles are dispersed (no visible clumps). This SIMPLESSE 100® dispersion is mixed with the oiUemulsifier/solids emulsion and mixed manually with a spatula. This blend is homogenized in a two stage APV Gaulin homogenizer at 1000/4600 psi. This liquid creamy mouthfeel agent contains a total of 3.7% solids (soluble and insoluble solids).

Example 2

Dry Creamy Mouthfeel Agent: A concentrated creamy mouthfeel agent (about 3353 g) is prepared from the following ingredients:

| Ingredient | Grams |
| --- | --- |
| Partially Hydrogenated Canola Oil | 500 |
| Simplesse ® 100 (microparticulated whey protein) | 180 |
| Starch | 130 |
| Corn Syrup Solids | 120 |
| Sodium Caseinate | 50 |
| Dipotassium Phosphate | 20 |
| Emulsifier | 20 |
| Water | 2333 |

The oil and emulsifiers are blended in a 4000 ml beaker and heated to 150° F. (65.5° C.) until all the fat has been melted. Twenty-three hundred and thirty-three grams of water at 180° F. (82° C.) is added to the oil/emulsifier blend and mixed with a high shear mixer for I minute to form the proper emulsion. The starch, corn syrup solids, sodium caseinate, and dipotassium phosphate are added while the high shear mixing continues. The SIMPLESSE100® is added to the oil/emulsifier/soluble solids emulsion and mixed. This blend is homogenized in a two stage APV Gaulin homogenizer at 1000/4600 psi. This concentrated liquid creamy mouthfeel agent contains a total of 30% solids (soluble and insoluble solids). The creamy mouthfeel agent is spray dried at the following conditions: air inlet temperature=215–230° C., outlet temperature=110–120° C.

Example 3

A flavored instant tea product (1000 g.) is prepared from the following ingredients:

| Ingredient | Grams |
| --- | --- |
| Dry Creamy Mouthfeel Agent from Example 2 | 600 |
| Sucrose | 278 |
| Aspartame | 1.0 |
| Acesulfame K | 1.0 |
| Instant Tea | 100 |
| Silicon dioxide | 10 |
| Flavors | 10 |

All of the ingredients are placed in a Hobart mixer and mixed for 5 minutes.

Flavored creamy tea beverage: A beverage (1000 ml) is prepared by mixing 75 grams of the dry mix and adding 925 ml of water at 180° F. (82° C.). This beverage contains a total of 7.5% solids (soluble and insoluble solids).

Example 4

Ready-to-drink beverage: A ready-to-drink orange beverage is prepared from the following formulation:

| Ingredient | % |
| --- | --- |
| Water | 72.25 |
| Dry Creamy Mouthfeel Agent from Example 2 | 10.30 |
| Sweetener | 12.00 |
| Orange juice | 5.00 |
| Citric Acid | 0.28 |
| Orange Flavors | 0.17 |

For a finished product batch, a beverage creamy mouthfeel agent preblend solution is prepared in a container fitted with high shear mixer as follows: The tank is loaded with hot water (160° F.). Under agitation, the beverage creamy mouthfeel agent is added at such a rate as to obtain a smooth mixture with no visible lumps. This may take several minutes. With continued high speed agitation the dry citric acid powder is added at a rate of 15 pounds/minute to a concentration of 80 mM. The median particle size of the particles of the creamy mouthfeel agent range from 0.30 microns to 0.80 microns.

The beverage creamy mouthfeel agent preblend solution is then added to a blend tank with the remaining ingredients. The blend tank is agitated with a sweep agitator at 28 rpm. This blend is pasteurized at 187±3° F. for 13±3 seconds and conventionally bottled.

Example 5

A. Chocolate dry mix. A chocolate powder mix is prepared from the following ingredients:

| Ingredient | % |
| --- | --- |
| Granular Sucrose | 67.16 |
| Creamy Mouthfeel Agent from Example 2 | 15.00 |
| Sodium Chloride | 0.40 |
| Fermented Cocoa Powder, 14% fat | 16.00 |
| Colors | 0.07 |
| Citric Acid | 0.50 |
| Butylated Hydroxytoluene (BHT) | 0.0004 |
| Vitamin Mix (vitamin C, riboflavin, niacin, thiamin and | 0.46 |

| Ingredient | % |
|---|---|
| pantothenic acid) | |
| Ferrous Fumarate | 0.06 |
| Mineral Mix (tribasic calcium phosphate) | 0.05 |
| Artificial Chocolate Flavor | 0.30 |

The chocolate powder is prepared by mixing the above ingredients together until the powder is homogeneous. A drinkable beverage is prepared by adding 25 g. of this powder to 240 ml of milk and then stirring vigorously.

This beverage contains a total of 19.4% total solids (soluble and insoluble).

B. Ready-to-drink fortified beverage. Preparation of a ready-to-serve nutritionally fortified beverage can be carried out in a similar manner to the preparation of beverage mixes (see A above), at least as it relates to the dry ingredients such as the cocoa powder, creamy mouthfeel agent, iron source, vitamins and other minerals, etc. The primary difference is the addition of an aqueous fluid, typically in an amount of from about 60 to about 98%, preferably from about 75 to about 95%, of the finished ready-to serve beverage product. Suitable aqueous fluids include water and milk. Suitable milk sources include whole milk, low fat milk, skim milk, milk fluids made by reconstituting milk powders with water and the like.

Example 6

Mayonnaise: A Mayonnaise is prepared from the following ingredients:

| Ingredients | % |
|---|---|
| Dry Creamy Mouthfeel agent from Example 2 | 82.19 |
| Whole eggs | 7.6 |
| Egg Yolks | 3.5 |
| Lemon Juice | 3.0 |
| Vinegar | 2.9 |
| Water | 2.5 |
| Salt | 0.75 |
| Mustard Powder | 0.3 |
| Onion Powder | 0.08 |
| White Pepper | 0.04 |
| Garlic Powder | 0.04 |

The whole eggs, egg yolks, lemon juice, salt, spices, and one tenth of the creamy mouthfeel agent are mixed in a blender at low speed for one minute. The creamy mouthfeel agent is then added during one minute while blending at low speed.

Example 7

Dip: A snack dip is prepared from the following ingredients:

| Ingredients | % |
|---|---|
| Dry Creamy Mouthfeel Agent from Example 2 | 40 |
| Water | 27 |
| Sour Cream | 20 |
| Lemon Juice | 5.5 |
| Garlic Herb Blend | 3.5 |
| Non-fat milk solids | 3.0 |
| Natural sour cream flavor | 0.5 |
| Artificial sour cream flavor | 0.5 |

In a blender running at medium speed, the nonfat milk solids, and flavors are slowly added to the water during a period of one minute. The creamy mouthfeel agent is added, and blending is continued for one minute. The mixture is transferred to a mixing bowl and mixed by hand with the sour cream and herb mix. The mixture is then refrigerated for several hours.

Example 8

Chocolate Mousse: A chocolate mousse is prepared from the following ingredients:

| Ingredients | % |
|---|---|
| Egg whites | 20.86 |
| Semi-sweet chocolate | 20.29 |
| Dry Creamy Mouthfeel Agent from Example 2 | 20.0 |
| Water #1 | 12.35 |
| Heavy Cream | 11.18 |
| Egg Yolks | 10.78 |
| Water #2 | 3.54 |
| Vanilla Extract | 1.0 |

The chocolate and water #2 are heated in a double boiler until the chocolate is melted. The egg yolks are beaten slightly, a small amount of chocolate mixture is added and mixed in well, and the resulting mixture is added to the remaining chocolate-water mixture in the double boiler and cooked for 1.5 minutes with constant stirring. The mixture is removed from heat and the vanilla extract is added. Water #1 is weighed into a blender. With the blender running at medium-high speed, nonfat milk solids are added slowly and blending is continued until the mixture is homogenious. The creamer is added, blending continued for about 30 seconds, and the resulting mixture is folded into the chocolate mixture. The heavy cream is whipped until soft peaks are formed, then folded into the mixture. The egg whites are whipped until soft peaks form and gently folded into the mixture until blended. The mixture is covered and refrigerated overnight.

Example 9

Creamy Beverage: A creamy beverage using the method described in Example 4. A creamy beverage drink is prepared utilizing the following compositions.

| Ingredients | % |
|---|---|
| Creamy Mouthfeel Agent from Example 2 | 50 |
| Sucrose | 19.5 |
| Aspartame | 0.12 |
| Acesulfame K | 0.12 |
| Instant coffee | 12 |
| Foaming Creamer | 12.06 |
| Dried egg white | 1.5 |
| Citric acid | 0.6 |
| Sodium bicarbonate | 0.74 |
| Sodium bicarbonate | 0.76 |
| Flavors | 1.76 |
| Carboxymethylcellulose | 1.6 |
| Total | 100.00 |
| Insoluble solids | 37.6 |
| Soluble solids | 62.4 |
| Total solids | |
| I/S | 0.6014 |

The chocolate and water #2 are heated in a double boiler until the chocolate is melted. The egg yolks are beaten slightly, a small amount of chocolate mixture is added and mixed in well, and the resulting mixture is added to the remaining chocolate-water mixture in the double boiler and cooked for 1.5 minutes with constant stirring. The mixture is removed from heat and the vanilla extract is added. Water #1 is weighed into a blender. With the blender running at medium-high speed, nonfat milk solids are added slowly and blending is continued until the mixture is homogenious. The creamer is added, blending continued for about 30 seconds, and the resulting mixture is folded into the chocolate mixture. The heavy cream is whipped until soft peaks are formed, then folded into the mixture. The egg whites are whipped until soft peaks form and gently folded into the mixture until blended. The mixture is covered and refrigerated overnight.

What is claimed is:

1. A creamy mouthfeel agent for food and beverage products which comprises:
   a) a water-insoluble component which comprises:
      1) from about 10 to about 50% of a substantially spheroidal, non-aggregated microparticulate component;
      2) from about 20 to about 40% of a fat/oil component;
      3) from about 0.5 to about 3% of an emulsifier component;
      4) from about 0 to about 3% of a microcrystalline cellulose component; and
   b) a water-soluble component which comprises:
      1) from about 0.05 to about 20% of a thickener;
      2) from about 0 to about 8% sodium caseinate;
      3) from about 0 to about 20% milk solids;
      4) from about 0 to about 2% processing aids; and
wherein the creamy mouthfeel agent is a dry particulate composition, and wherein the water-insoluble components comprises at least 60% of the total solids of the creamy mouthfeel agent.

2. A creamy mouthfeel agent according to claim 1 wherein the emulsifier is selected from the group consisting of lecithin, monoglycerides, diglycerides, diacetyl tartaric acid esters of monoglycerides, and combinations thereof.

3. A creamy mouthfeel agent according to claim 1 wherein the microparticulate component is selected from the group consisting of plant proteins, dairy proteins, and mixtures thereof.

4. A creamy mouthfeel agent according to claim 1 wherein the microparticulate component is prepared from a carbohydrate selected from the group consisting of starches, gums, cellulose, calcium alginate, cross-linked dextran, gellan gum, curdlan, konjac mannan, chitin, schizophyllan, chitosan, and mixtures thereof.

5. A creamy mouthfeel agent according to claim 1 wherein the microparticulate component is prepared from a protein selected from the group consisting of egg proteins, whey proteins, plant proteins, microbial proteins, and mixtures thereof.

6. A creamy mouthfeel agent according to claim 1 wherein the microparticulate component comprises whey protein.

7. A creamy mouthfeel agent according to claim 1 further comprising a buffer selected from the group consisting of a disodium or dipotassium salt of citric or phosphoric acid, and mixtures thereof.

8. A creamy mouthfeel agent according to claim 1 wherein the thickener is selected from the group consisting of locust bean gum, guar gum, gellan gum, xanthan gum, gum ghatti, modified gum ghatti, tragacanth gum, carrageenan, carboxymethylcellulose, sodium carboxymethylcellulose, corn starch, wheat starch, tapioca starch, pregelatinized high amylose-content starch, pregelatinized hydrolyzed starches, maltodextrins, corn syrup solids, chemically-modified starches, and mixtures thereof.

9. A creamy mouthfeel agent according to claim 1 comprising from about 0 to about 4% flow aids selected from the group consisting of silicon dioxide, silica aluminates, anti-caking agents, dispersing aids, and mixtures thereof.

10. A creamy mouthfeel agent according to claim 1 wherein the fat/oil component is selected from the group consisting of non-digestible fats, non-digestible oils, and mixtures thereof.

11. A creamy mouthfeel agent according to claim 1 wherein the emulsifier component is selected from the group consisting of lecithin, monoglycerides, diglycerides, diacetyl tartaric acid esters of monoglycerides, and combinations thereof.

* * * * *